United States Patent [19]
Cho

[11] Patent Number: 6,115,161
[45] Date of Patent: Sep. 5, 2000

[54] COMPUTER WITH WIDE ANGLE INFRARED COMMUNICATION EQUIPMENT

[75] Inventor: Hwan-cheol Cho, Yongin, Rep. of Korea

[73] Assignee: SamSung Electronics., Ltd., Suwon, Rep. of Korea

[21] Appl. No.: 08/910,564

[22] Filed: Aug. 20, 1997

[30] Foreign Application Priority Data

Aug. 21, 1996 [KR] Rep. of Korea ............ 96-34721

[51] Int. Cl.[7] ................................. G08B 17/12
[52] U.S. Cl. ................................. 359/152; 359/159
[58] Field of Search .................. 359/159, 152, 359/142, 163, 172

[56] References Cited

U.S. PATENT DOCUMENTS

| | | |
|---|---|---|
| 3,476,921 | 11/1969 | Jones et al. . |
| 5,191,461 | 3/1993 | Cranshaw et al. ............ 359/154 |
| 5,218,345 | 6/1993 | Mueller et al. . |
| 5,308,985 | 5/1994 | Lee . |
| 5,359,446 | 10/1994 | Johnson et al. . |
| 5,452,135 | 9/1995 | Maki et al. . |
| 5,530,578 | 6/1996 | Takemoto et al. ............ 359/152 |
| 5,543,620 | 8/1996 | Lin et al. . |
| 5,572,033 | 11/1996 | Grant . |
| 5,585,632 | 12/1996 | Hull et al. . |
| 5,641,963 | 6/1997 | Mueller . |
| 5,781,407 | 7/1998 | Brauel ............ 361/683 |
| 5,903,374 | 5/1999 | Kobayashi ............ 359/159 |

*Primary Examiner*—Leslie Pascal
*Assistant Examiner*—Mohammad Sedighian
*Attorney, Agent, or Firm*—Robert E. Bushnell, Esq.

[57] ABSTRACT

The present invention relates to a computer having an infrared communication module for an infrared communication with external equipments. In the computer according to the present invention, since the location of the infrared communication module can change with respect to a main body, the infrared communication between the computer and the external equipments can be performed without changing the position of the computer.

12 Claims, 5 Drawing Sheets

COMPUTER WITH WIDE ANGLE INFRARED COMMUNICATION EQUIPMENT

CLAIM OF PRIORITY

This application makes reference to, incorporates the same herein, and claims all benefits accruing under 35 U.S.C. §119 from an application for a Computer earlier filed in the Korean Industrial Property Office on Aug. 21, 1997 and there duly assigned Ser. No. 34721/1996.

DESCRIPTION OF THE RELATED ART

The present invention relates to sending and receiving infrared signals. In particular, this invention relates to the ability of a transmitter or a receiver to communicate with a device that is placed at an angle from the infrared communications unit. Much work has been done to provide infrared transmitters and receivers that can send and receive across a wide angle. For example, U.S. Pat. No 5,572,033 for a Wide-Angle Infra-Red Detection Apparatus to Grant discloses a passive infra red detection apparatus that provides for a wider viewing angle. U.S. Pat. No. 5,308,985 for a Wide-Angle Passive Infrared Radiation Detector to Lee provides nearly a 180 degree field of view. U.S. Pat. No. 5,641,963 for an Infrared Location System to Mueller discloses an infrared detection system connected to a computer. However, each of these references are for detectors, and not for transmission of infrared radiation at a wide angle.

U.S. Pat. No 5,359,446 for a Wide-Angle, High-Speed, Free-Space Optical Communications System to Johnson et al discloses a wide angled infrared transmitter/receiver pair connected to a computer. The invention requires infrared prisms, mirrors, and windows to function properly. What is needed is a more simplified module for allowing for wide angled transmission and reception of infrared radiation.

SUMMARY OF THE INVENTION

To solve the above mentioned problem, an object is to provide an improved and simplified system for wide angle transmission and reception of infrared radiation.

It is yet another object to provide infrared detectors and transmitters on a rotating body where the user can quickly and easily adjust the angle of the transmitter or detector.

To achieve the above object, there is provided a computer, comprising a main body having therein a signal processing device, an infrared communication module which is electrically connected to the signal processing device for an infrared communication between the signal processing device and an external equipment, and rotating means rotatably combined to the main body, wherein the infrared communication module is installed in the rotating means.

To achieve the above object, there is provided a computer of another type, comprising a main body having therein a signal processing device, an infrared communication module which is electrically connected to the signal processing device for an infrared communication between the signal processing device and an external equipment, first rotating means rotatably combined to the main body in a first direction, and second rotating means rotatably combined to the first rotating means in a second direction which is different from the first direction, wherein the infrared communication module is installed in the second rotating means.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
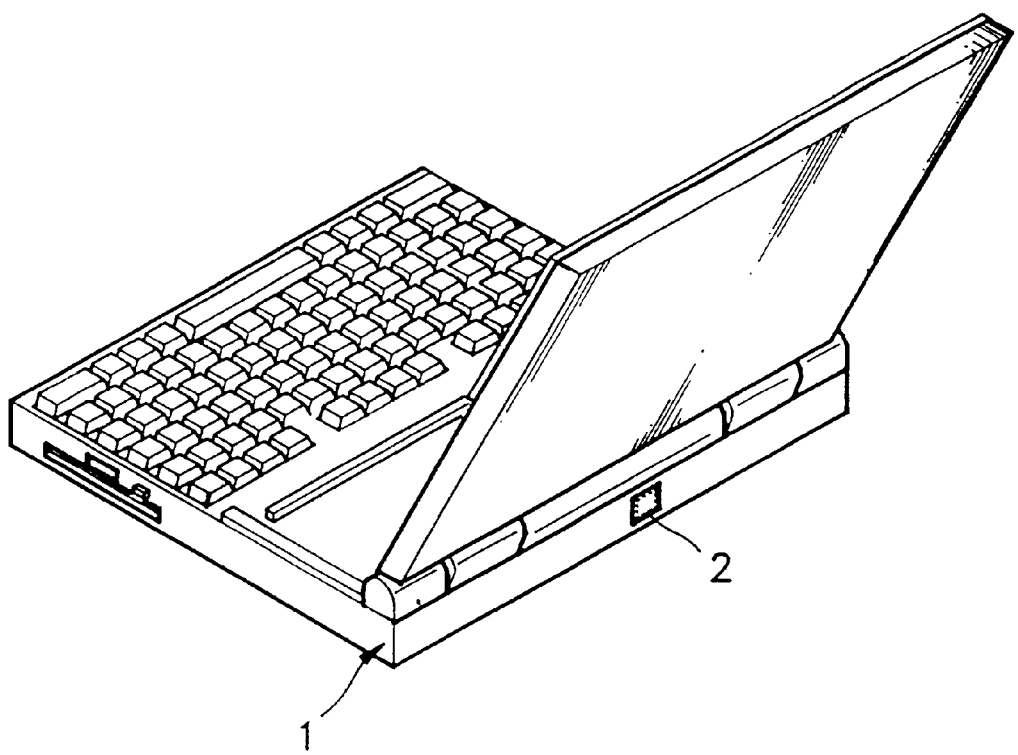
FIG. 1 is a perspective view of an example of an earlier computer.

FIG. 1 shows a portable computer such as a notebook computer as an example of the above-mentioned computer. An infrared communication module 2 is fixed to the frontal surface of a main body 1 of the computer so as to perform the infrared communication between a signal processing device in the main body 1 and an external equipment such as another computer or a printer.

However, a scope within which the infrared communication is available by the infrared communication module 2 is generally limited to an angle of 30 degrees in front of the infrared communication module 2. Therefore, since the infrared communication cannot be performed when the external equipment to perform the infrared communication with the computer is located out of the above scope, it is required to change the location of the external equipment to be within the above scope.

Figure 2A:
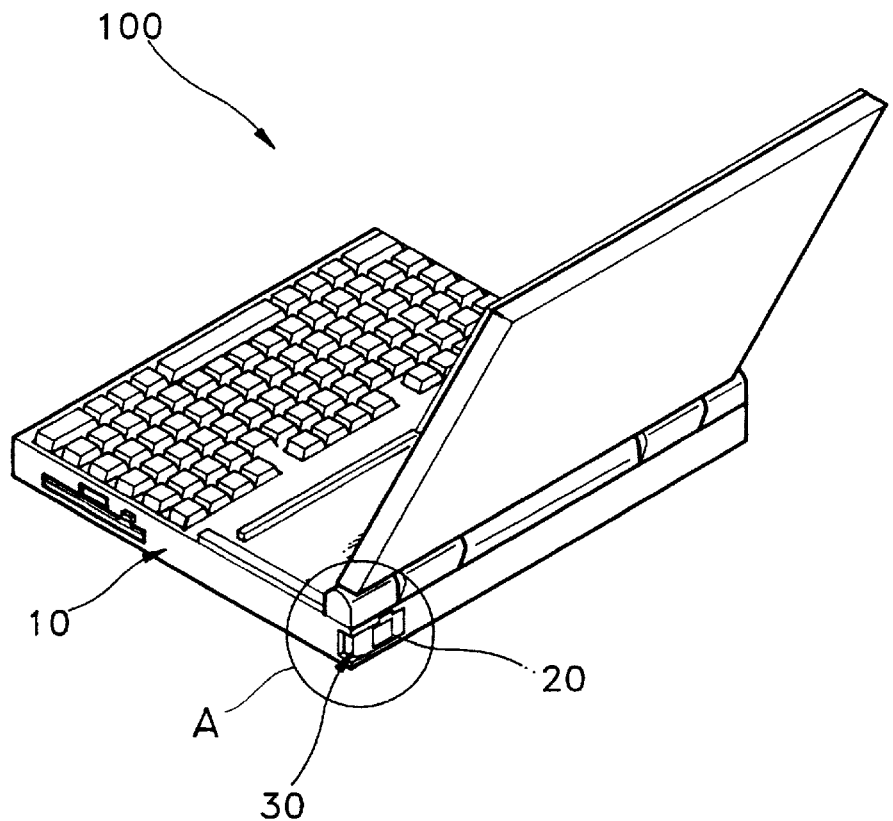
FIG. 2A is a perspective view of a computer having an infrared communication module portion according to an embodiment of the present invention.
Figure 2B:
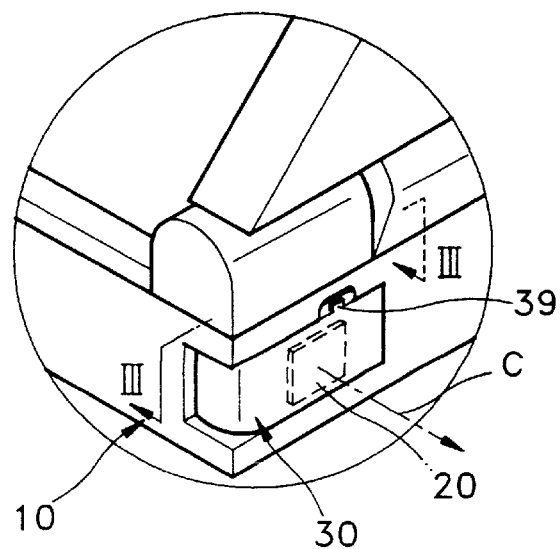
FIG. 2B is an amplified view of the infrared communication module shown in FIG. 2A.

Referring to FIGS. 2A and 2B, a computer according to an embodiment of the present invention comprises a main body 10 having a signal processing device and an infrared communication module 20 for an infrared communication with external equipments, which is similar to the earlier computer as shown in FIG. 1. However, the embodiment of the present invention is different from the earlier computer in that the infrared communication module 20 is built in a rotating body 30 and the rotating body 30 is rotatably installed in the main body 10.

Figure 3:
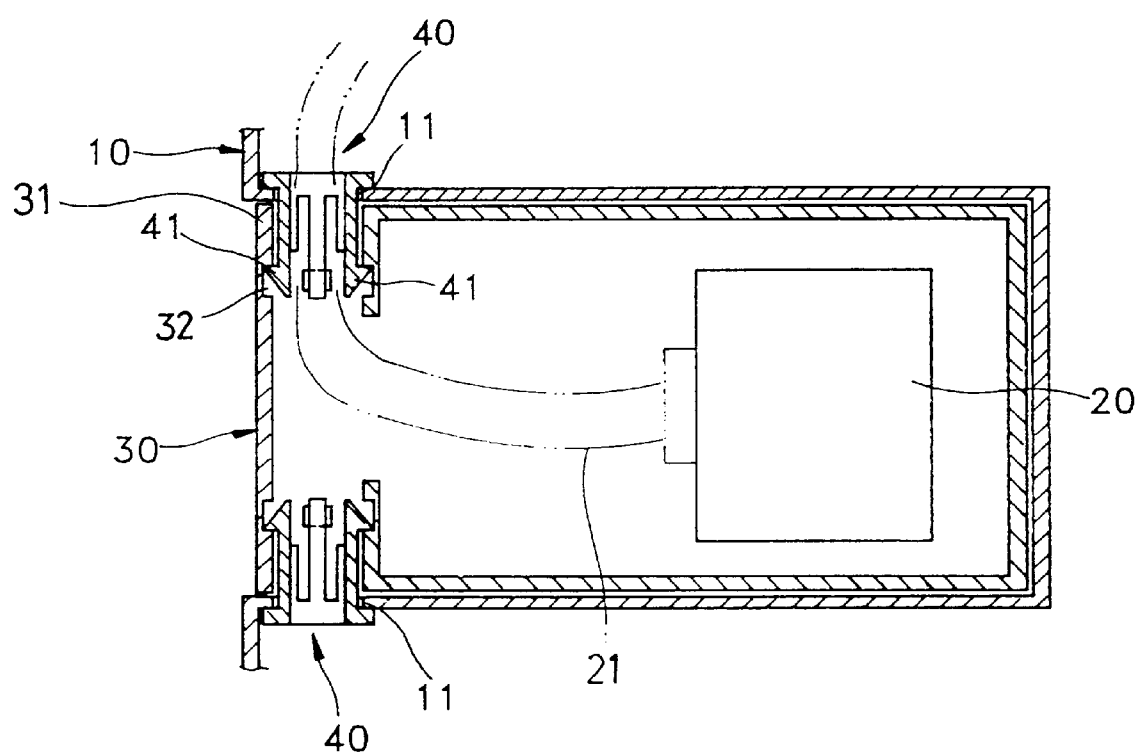
FIG. 3 is a schematic sectional view taken along line III–III' of the computer shown in FIG. 2B.

An example of a structure in which the rotating body 30 is combined to the main body 10 is schematically shown in FIG. 3. Referring to FIGS. 2A, 2B and 3, hollow combining portions 31 having a circular section are respectively formed in upper and lower portions of one side of the rotating portion 30 having therein the infrared communication module 20, and a plurality of hooking grooves 32 are formed at the inner circumference of the respective combining portions 31. Holes 11 are formed in the main body 10 corresponding to the respective combining portions 31. The rotating body 30 is supported in the main body 10 as being coupled by hollow hinge shafts 40 rotatably inserted into the respective holes 11. Hooks 41 hooked on the hooking grooves 32 of the rotating body 30 are formed on the respective hinge shafts 40. The hinge shafts 40 are fixed with respect to the rotating body 30 by the combination of the hooks 41 and the hooking grooves 32. Since the hinge shafts 40 are rotatably inserted into the main body 10, the rotating body 30 integrated with the hinge shafts 40 is rotatable with respect to the main body 10.

The infrared communication module 20 built in the rotating body 30 is connected to a signal processing device in the main body 10 via wires 21 for transmitting signals. Here, the wires 21 are connected to the signal processing device in the main body 10 passing through the upper hinge shaft 40. According to such a construction, it is possible to prevent the wires 21 from being twisted or exposed to the outside during the rotation of the rotating body 30. In FIG. 2B, reference numeral 39 denotes a knob for rotating the rotating body 30.

In the computer constructed as above, when an external equipment for the infrared communication is positioned in front of the computer, i.e., the infrared communication module (which corresponds to the C direction in FIG. 2B), the infrared communication can be performed between the computer and the equipment in the state as shown in FIGS. 2A and 2B.

Figure 4:
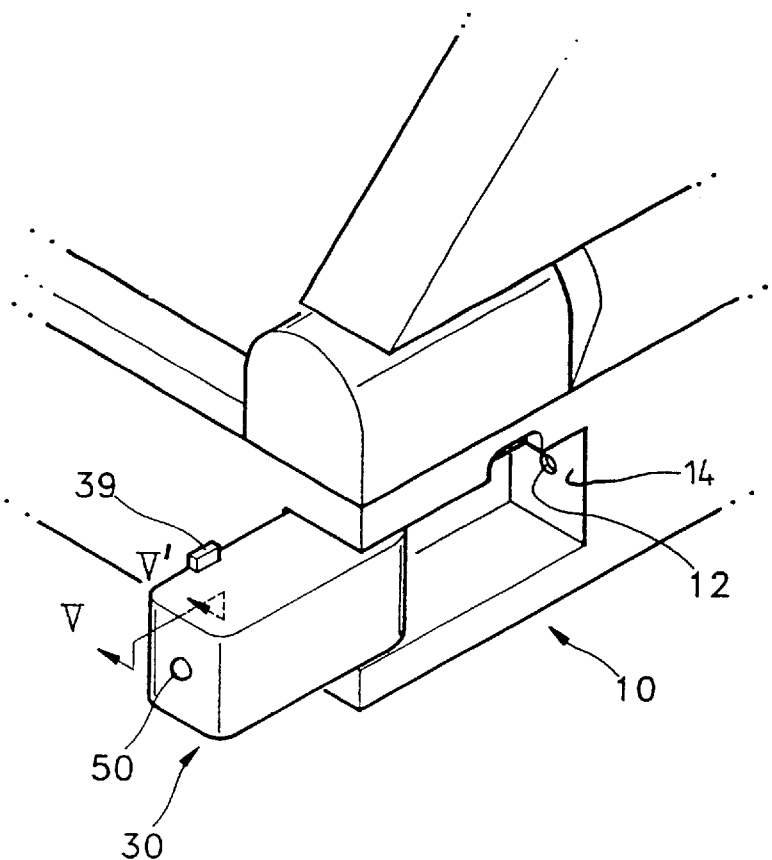
FIG. 4 is a schematic perspective view for showing a state in which a rotating body of the computer shown in FIGS. 2A and 2B rotates at a 180 degree.

In case that the equipment is out of a predetermined degree scope of the infrared communication module 20, for example, in case the equipment is positioned behind the infrared communication module 20, the rotating body 30 is rotated by an angle of 180°, as shown in FIG. 4. Accordingly, the infrared communication can be performed between the computer and the equipment which is positioned behind the infrared communication module since the built-in infrared communication module 20 rotated by an angle of 180° along with the rotating body 30 directs the rear portion in which the equipment is positioned, without turning the computer itself around. In case that the external equipment is positioned at the side of the computer, the rotating body 30 is rotated by an angle of 90° from the state shown in FIGS. 2A and 2B.

Figure 5:
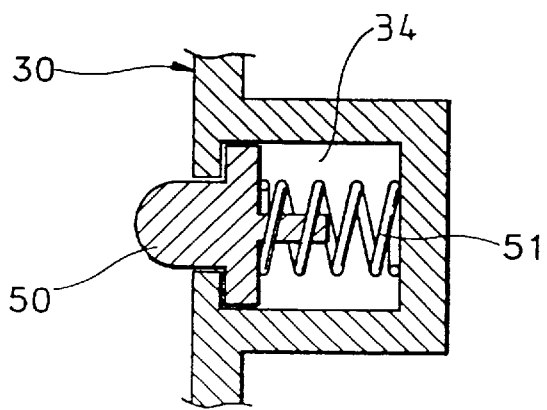
FIG. 5 is a schematic sectional view taken along line V–V' of the rotating body shown in FIG. 4.

When the infrared communication with the external equipment is completed in the state shown in FIG. 4, it is preferable to return the rotating body 30 to the initial position as shown in FIGS. 2A and 2B for the convenience of managing and keeping the computer. It is preferable that a locking means for preventing the rotating body 30 shown in FIGS. 2A and 2B from being easily rotated due to vibration or undesirable external force is further provided. In the embodiment of the present invention, as shown in FIG. 4 and FIG. 5 showing the section taken along the V–V' line of FIG. 4, there is provided a receiving hole 12 formed at a wall 14 of the main body 10 to which a free end portion of the rotating body 30 is adjacent and a protrusion 50 installed in the rotating body 30 so as to be elastically protruded from a space 34 formed in the free end portion of the rotating body 30 by a spring 51 installed in the space 34 and inserted into the receiving hole 12 of the main body 10 when the rotating body 30 is positioned as shown in FIGS. 2A and 2B.

While the rotating body 30 is rotated from the state shown in FIG. 4 to the state shown in FIGS. 2A and 2B, the protrusion 50 is retreated into the space 34 of the rotating body 30 while pressing against the wall 14 of the main body 10 to compress the spring 51, and is then combined into the receiving hole 12 of the main body 10 by being protruded by a restoring force of the spring 51 in the state shown in FIGS. 2A and 2B. The rotating body 30 is locked in the main body 10 by the combination of the protrusion 50 of the rotating body 30 to the receiving hole 12 of the main body 10. When the knob 39 of the rotating body 30 is pulled by an appropriate force in the state in which the rotating body 30 is locked, the locking of the rotating body 30 is released through the reverse procedure to the locking process and rotates outward.

In the computer according to the embodiment of the present invention, since the rotating body 30 having the infrared communication module 20 is rotatable in the horizontal direction, the infrared communication module 20 can direct the external equipment by the rotation of the rotating body 30 even though the external equipment for the infrared communication with the computer is positioned beside or behind the computer. Thus, the infrared communication with the external equipment can be performed without turning the computer itself.

Figure 6:
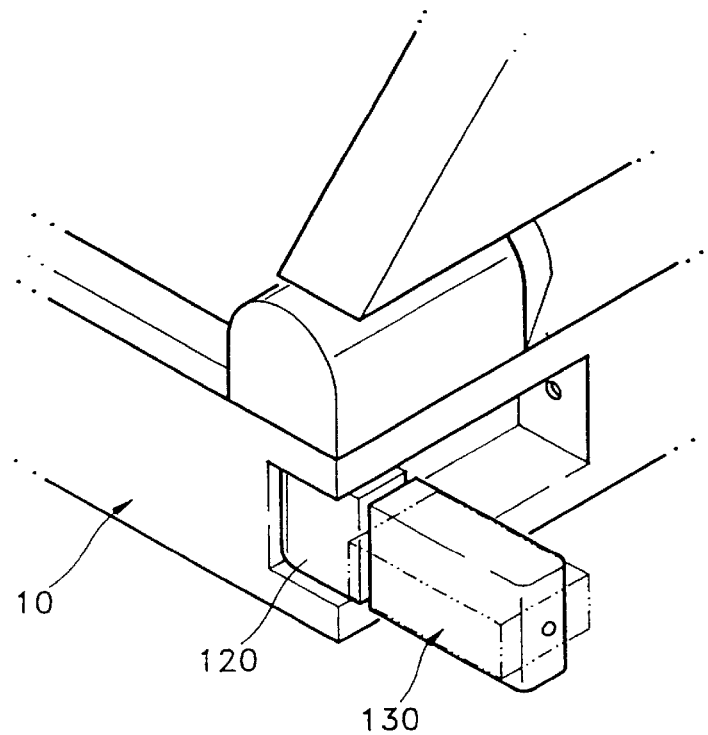
FIG. 6 is a schematic perspective view of a computer according to another embodiment of the present invention.
Figure 7:
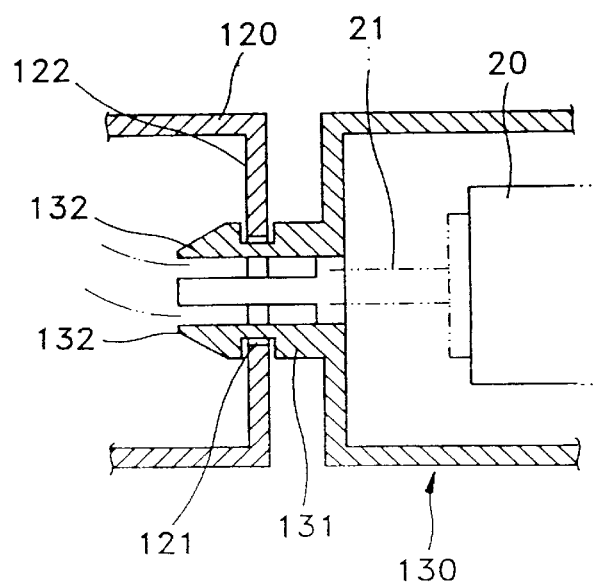
FIG. 7 is a schematic sectional view of a portion in which a first rotating body and a second rotating body shown in FIG. 6 are connected to each other.

FIG. 6 is a schematic perspective view of the main body of a computer having an infrared communication module according to another embodiment of the present invention and FIG. 7 is a schematic sectional view of a portion in which a first rotating body and a second rotating body shown in FIG. 6 are connected to each other.

In the computer having the structure of the infrared communication module shown in FIGS. 6 and 7, the infrared communication module 20 can change its direction horizontally and vertically. In the above structure, a first rotating body 120 is combined to the main body 10 having therein a signal processing device to be rotatable horizontally. Here, since the combination structure of the main body 10 to the first rotating body 120 is the same as that of the main body 10 to the rotating body 30 shown in FIG. 3, the description thereof will be omitted. A second rotating body 130 is rotatably installed to the first rotating body 120 in the direction different from that of the first rotating body 120. Preferably, the second rotating body 130 is rotatable in a vertical plane, while the first rotating body 120 is rotatable in a horizontal plane.

The combination structure of the first rotating body 120 to the second rotating body 130 is described as follows with reference to FIG. 7. A circular hole 121 is formed in a free end of the first rotating body 120 and a hollow protruding portion 131 is formed in the second rotating body 130. A plurality of hooks 132 are radially formed in the end tip of the hollow protruding portion 131. The hooks 132 are inserted into the hole 121 of the first rotating body 120 and hooked on the inner wall 122 of the first rotating body 120, so that the escape of the second rotating body 130 from the first rotating body 120 is prevented and the second rotating body 130 can be rotatable centering the hollow protruding portion 131. Then infrared communication module 20 is built in the second rotating body 130. The infrared communication module 20 is connected to the signal processing device in the main body 10 via the signal transmitting wire 21. The other end of the signal transmitting wire 21 whose one end is connected to the infrared communication module 20 passes through the hollow protruding portion 131 and through the combination portion of the first rotating body 120 to the main body 10 to be connected to the signal processing device, as shown in FIG. 3.

In the computer according to such an embodiment, since the infrared communication module 20 can change its location horizontally during the rotation of the first rotating body 120 with respect to the main body 10 and also change its location vertically during the rotation of the second rotating body 130 with respect to the first rotating body 120, the three-dimensional change of the location thereof is possible. Therefore, even though the computer according to the embodiment of the present invention is positioned at a different height and angle from those of the external equipment for the infrared communication, the infrared communication can be performed between the computer and the external equipment by appropriately adjusting the angle of the first rotating body 120 with respect to the main body 10 and that of the second rotating body 130 with respect to the first rotating body 120.

The present invention has been described on the basis of the above-described embodiments. However, the present invention is not restricted to the above embodiments and it is clearly understood that many variations are possible within the scope and spirit of the present invention by anyone skilled in the art. For example, even though the present invention has been explained with respect to a portable computer, the present invention can be applied to a general desktop computer. Also, even though the rotating body 30 having therein the infrared communication module 20 is formed to rotate in the horizontal direction in the embodiment described with reference to FIGS. 2A to 5, it can be constructed to rotate in a vertical or inclined direction. Other than the combination structure of the first rotating body to the second rotating body shown in FIG. 7, various types of the combination structure can be adopted.

According to the present invention, since the location of the infrared communication module can change with respect to the main body, the infrared communication between the computer and the external equipment can be performed without changing the position of the computer.

What is claimed is:

1. An infrared communication equipment for an electronic device having a main body, comprising:
    an infrared communication module which is electrically connected to a signal processing device, said signal processing device being disposed within said main body of said electronic device; and
    a rotating means having said infrared communication module being installed on said rotating means, said rotating means having said infrared communication module installed thereon capable of rotating unobstructed through an angle of 180 degrees allowing said infrared communication module to send and receive infrared signals over a 180 degree scan, wherein a receiving hole is formed in a predetermined position of said main body of said electronic device and a protrusion is installed to said rotating means so as to be elastically protruded with respect to said rotating means.

2. The infrared communication equipment of claim 1, wherein said rotating means comprises:
    a hollow hinge shaft; and
    a rotating body where said infrared communication module is built onto, and combined with said hinge shaft to rotate along said 180 degree scan with said hinge shaft.

3. The infrared communication equipment of claim 2, wherein a receiving hole is formed in a predetermined position of said main body and
    a protrusion is installed to said rotating body so as to be elastically protruded with respect to said rotating body.

4. The equipment of claim 2, wherein said rotating body contains a knob to allow a user to rotate said rotating body.

5. The equipment of claim 2, wherein said electronic device is a portable computer.

6. The equipment of claim 5, wherein said rotating means is located at a corner of said main body of said portable computer.

7. An infrared communication equipment for an electronic device, comprising:
    an infrared communication module which is electrically connected to a signal processing device;
    a first rotating means; and
    a second rotating means rotatable combined with said first rotating means in a second direction which is different from the first direction,
    said infrared communication module being installed on said second rotating means, wherein said first rotating means comprising:
    a hollow hinge shaft; and
    a first rotating body combined with said hinge shaft to rotate along with said hinge shaft said second rotating means comprising a hollow protrusion combined with said first rotating body to be rotatable in said second direction and a second rotating body where said infrared communication module is built.

8. The infrared communication equipment of claim 7, a receiving hole being formed in a predetermined position and a protrusion is installed to said second rotating body so as to be elastically protruded with respect to said second rotating body.

9. An infrared communication equipment for an electronic device, comprising:
    an infrared transmitting and receiving device electrically connected to a signal processing device;
    a first rotating body having an external surface containing said infrared transmitting and receiving device: and
    a second rotating body connected to said first rotating body and rotates in a direction orthogonal to said first rotating body, allowing said infrared transmitting and receiving device to be oriented in any direction, said first rotating body having an elastic protrusion located thereon.

10. A computer comprising:
    a main body having therein a signal processing device;
    an infrared communication module which is electrically connected to the signal processing device, for infrared communication between the signal processing device and external equipment; and
    rotating means rotatably combined with the main body and containing said infrared communication module wherein said rotating means comprises a first rotating body rotatably combined with said main body; and
    a second rotating body containing said infrared communication module, rotatably combined with said first rotating body and having a rotation axis orthogonal to that of the first rotating body.

11. The computer of claim 10, wherein said first rotating body and said second rotating body each rotate through an angle of 180 degrees.

12. An infrared communication equipment for an electronic device having a main body, comprising:
    an infrared communication module which is electrically connected to a signal processing device; and
    a rotating means having said infrared communication module being installed on said rotating means, wherein said rotating means comprises:
    a hollow hinge shaft; and
    a rotating body where said infrared communication module is built onto, and combined with said hinge shaft to rotate along with said hinge shaft, wherein a receiving hole is formed in a predetermined position of said main body of said electronic device and a protrusion is installed to said rotating body so as to be elastically protruded with respect to said rotating body.

* * * * *